(12) United States Patent
Short, III

(10) Patent No.: US 6,811,291 B1
(45) Date of Patent: Nov. 2, 2004

(54) DETECTOR FOR SIGNALS WITH HARMONICALLY RELATED COMPONENTS

(75) Inventor: Robert D. Short, III, Sterling, VA (US)

(73) Assignee: Lockheed Martin Corporation, Bethesda, MD (US)

( * ) Notice: Subject to any disclaimer, the term of this patent is extended or adjusted under 35 U.S.C. 154(b) by 1826 days.

(21) Appl. No.: 06/594,171

(22) Filed: Mar. 28, 1984

(51) Int. Cl.[7] .......................... G01R 23/16; G01S 13/52; G01H 1/00
(52) U.S. Cl. ................. 324/825; 324/76.19; 324/76.47; 324/76.68; 342/190; 342/192
(58) Field of Search ....................... 343/55 A; 324/78 F, 324/78 D, 76.28, 76.19, 76.47, 76.31, 76.68; 342/190, 192, 194

(56) References Cited

U.S. PATENT DOCUMENTS

| | | | | | |
|---|---|---|---|---|---|
| 3,976,863 A | * | 8/1976 | Engel | .......................... | 364/724 |
| 4,204,278 A | * | 5/1980 | Nelson | .......................... | 367/49 |
| 4,241,350 A | * | 12/1980 | Uffelman | ................... | 343/55 A |
| 4,245,220 A | * | 1/1981 | Johnson | ....................... | 367/102 |
| 4,298,985 A | * | 11/1981 | Ballard et al. | ................. | 375/82 |
| 4,339,711 A | * | 7/1982 | Inami et al. | ............... | 324/77 B |
| 4,358,733 A | * | 11/1982 | Hanahara | ................... | 324/77 E |
| 4,377,961 A | * | 3/1983 | Bode | ......................... | 324/77 E |
| 4,389,647 A | * | 6/1983 | Fanuele et al. | ............ | 343/55 A |

* cited by examiner

Primary Examiner—Nelson Moskowitz
(74) Attorney, Agent, or Firm—Duane Morris LLP

(57) ABSTRACT

A processor that utilizes the presence of harmonic components in a noisy signal environment to enhance the desired frequency spectrum of the signal. Received signal and noise are filtered to separate the harmonic components of the signal. These harmonic components are then combined in a prescribed manner to form a multiplicity of combined signals with varying harmonic content. The combined signals are then further processed to establish a signal detection.

6 Claims, 9 Drawing Sheets

DETECTOR FOR SIGNALS WITH HARMONICALLY RELATED COMPONENTS

BACKGROUND OF THE INVENTION

1. Field of the Invention

The invention pertains to the field of signal detection and more particularly to the detection of signals having harmonically related components.

2. Description of the Prior Art

The physical processes involved in the emission, reflection, and transmission of electromagnetic or acoustical signals often produce secondary signals which are harmonically related to the primary signal. Emissions as for example, from non-linear waveform transformations, introduce harmonical components that are phase coherent with a fundamental frequency. An illustration of this is the reflection of electromagnetic signals from the boundary of two dissimilar metals. The dissimilarity of the metals forms a diode junction and an incident signal is subjected to the non-linear diode response before it is reflected-from the boundary. Another source of electromagnetic harmonic signal generation is the reflection from aircraft propeller and jet engines. Propeller and jet engine rotation induce a complex modulated pattern on reflective signal that is rich in harmonics. Since this modulation varies with the engine and aircraft configuration a spectral analysis of the modulation signal may be used for aircraft identification.

In the prior art these complex signals are filtered for harmonic separation, envelope detected, each detected signal integrated, and the resulting integrations summed. This process provides improved detection over systems that operate with the primary signal only when the receive signal is sufficiently stable to maintain the signal components within the designated filters. The signal frequency in many applications is not stable and the generated signal components may wander out of the designated filters. Compensation for this signal frequency instability may be accomplished by providing additional filters of sufficient number and bandwidth to span the frequency space between basic harmonic filters. The output of these filters may then be enveloped detected and subsequently used for spectral display or post detection processing. Since no stable reference exists a sum of integrated signals for the deflected components can not be realized and the output of each filter must be individually displayed and processed.

SUMMARY OF THE INVENTION

In accordance with the present invention a system for detecting signals having harmonically related components employs a plurality of harmonically related filter banks, the first bank having filters of equal bandwidth and center frequencies equal to the fundamental of the received signal plus an integer multiple of the common bandwidth such that the center frequency separation is equal to the common bandwidth. Subsequent filter banks, as for example that for the $k^{TH}$ harmonic, have filters with equal bandwidths that are k times the bandwidth of the filters in the fundamental frequency filter bank and have center frequencies that are k times the center frequencies of the fundamental filter bank, thus providing center frequency separations equal to k times the common bandwidth of the fundamental filter bank. In this manner each of the filter banks, succeeding the fundamental filter bank, have filters correspondingly related to the plurality of filters in the fundamental bank. These corresponding filters are summed in an escalating manner (fundamental plus second harmonic, fundamental plus second, and third harmonics, etc.) to form groups of a multiplicity equal to the number of filters in each filter bank. The sums of each group are coupled to a processor wherein a dynamic integration or other suitable processing is performed to establish a signal detection and harmonic content.

In a second embodiment of the invention, employed with ten signals within a finite band that extends from d.c., two filter banks are employed. The first filter bank contains a plurality of filters, each of equal bandwidth with center frequencies commencing at and separated by the bandwidth of the filters. The output terminals of these filters, which may number Q, are grouped such that, for example, the first M output terminals are coupled to amplifiers and given equal predetermined weights. A second group, commencing with the second output terminal to the output terminal 3M+1 are coupled to amplifiers and given a second predetermined weight. Since this group contains the output of three times as many filters as the previous group, the amplifier outputs are combined in threes to provide ultimate output terminals of a multiplicity equal to that of the first group. Each filter group formed has the first filter output terminal of the group being the filter output terminal that is the second filter output terminal of the previous filter group and has the last filter output terminal that which provides 2M more output terminals to the group over the number of output terminals utilized in the previous group. The signals at the group output terminals are each given a weight for that group and the output terminals of the weighting amplifiers are combined to provide ultimate output terminals of a multiplicity that is equal to the multiplicity of the ultimate output terminals of all the previous filter output terminal groupings.

The second filter bank possesses a multiplicity of filters having bandwidths that are substantially equal to the bandwidth of the filters in the first filter bank and center frequencies that are upwardly displaced from the center frequency of the corresponding filter in the first filter bank by one-half a bandwidth. The output terminals of this second filter bank are grouped as described above for the first filter bank except that the first grouping comprises the first 2M output terminals. The totality of ultimate output terminals from the two filter banks form K ordered groups with equal numbers of ultimate output terminals therewithin. The ultimate output terminals of each group are correspondingly coupled to summation networks and the output terminals thereof are coupled to processors in like manner as the above discussed embodiment.

DESCRIPTION OF THE PREFERRED EMBODIMENTS

Figure 1:
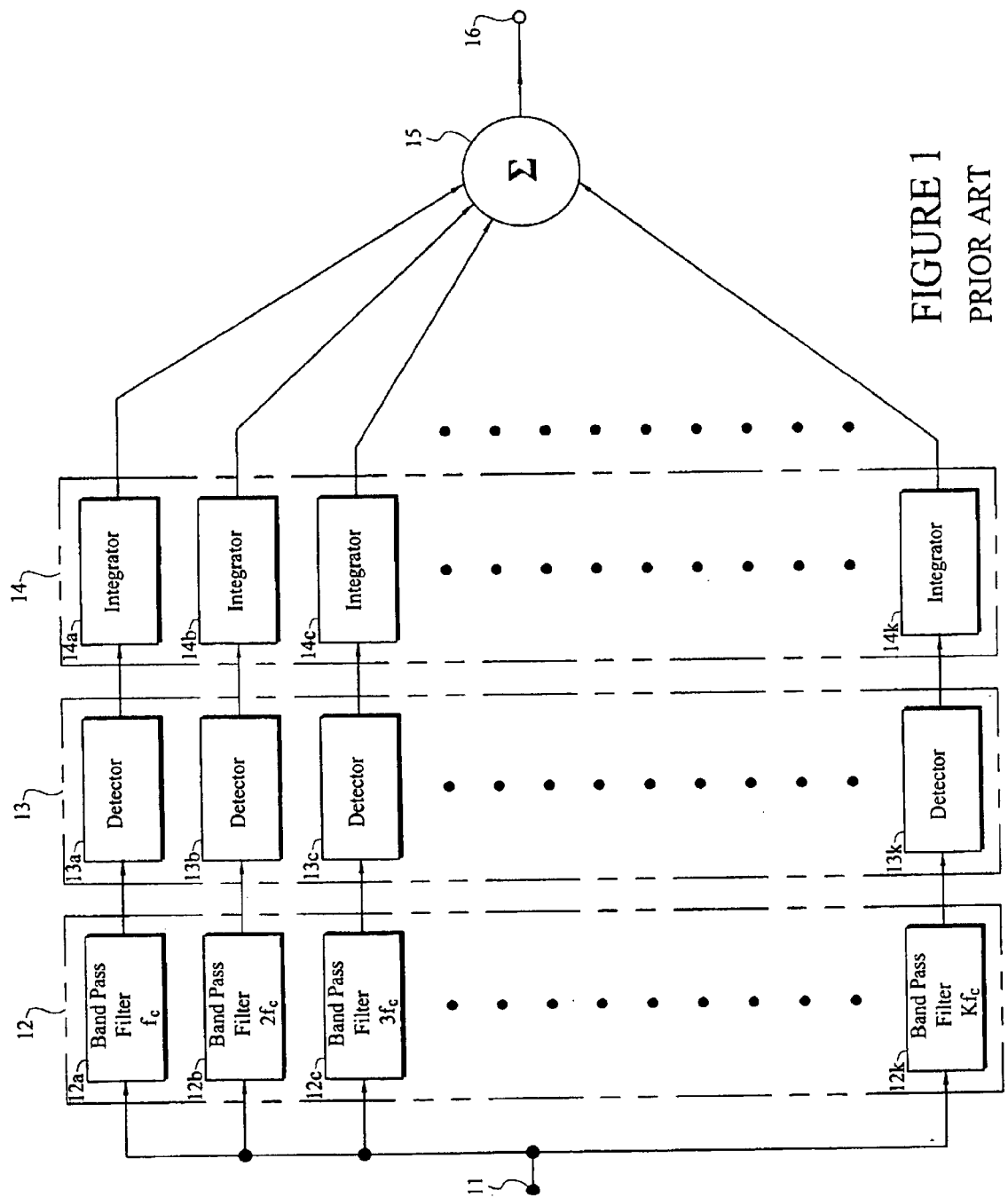
FIG. 1 is a block diagram of a harmonic signal processor known in the prior art.

Complex signals with harmonically related components may be processed by decomposing the signals into harmonic components, integrating detected signals for each harmonic component separately, and summing the resulting integrated output signals. A block diagram of an apparatus for performing these functions is illustrated in FIG. 1. A received signal at input terminal 11 is coupled to a filter bank 12 containing filters 12a–12k. Filter 12a is tuned to the fundamental signal frequency while filters 12b–12k are successively tuned to harmonics of the fundamental. The output signal from each filter is detected and integrated by a corresponding detector and integrator in detector bank 13 and integrator bank 14 respectively. Each integrated signal is coupled to a summation network 15 to provide a sum thereof at output terminal 16. If the signal frequency is stable each component follows the designated path and all the harmonics enter the detection process, thus providing an enhanced probability of detection over a system of processors for only the fundamental component.

Figure 2:
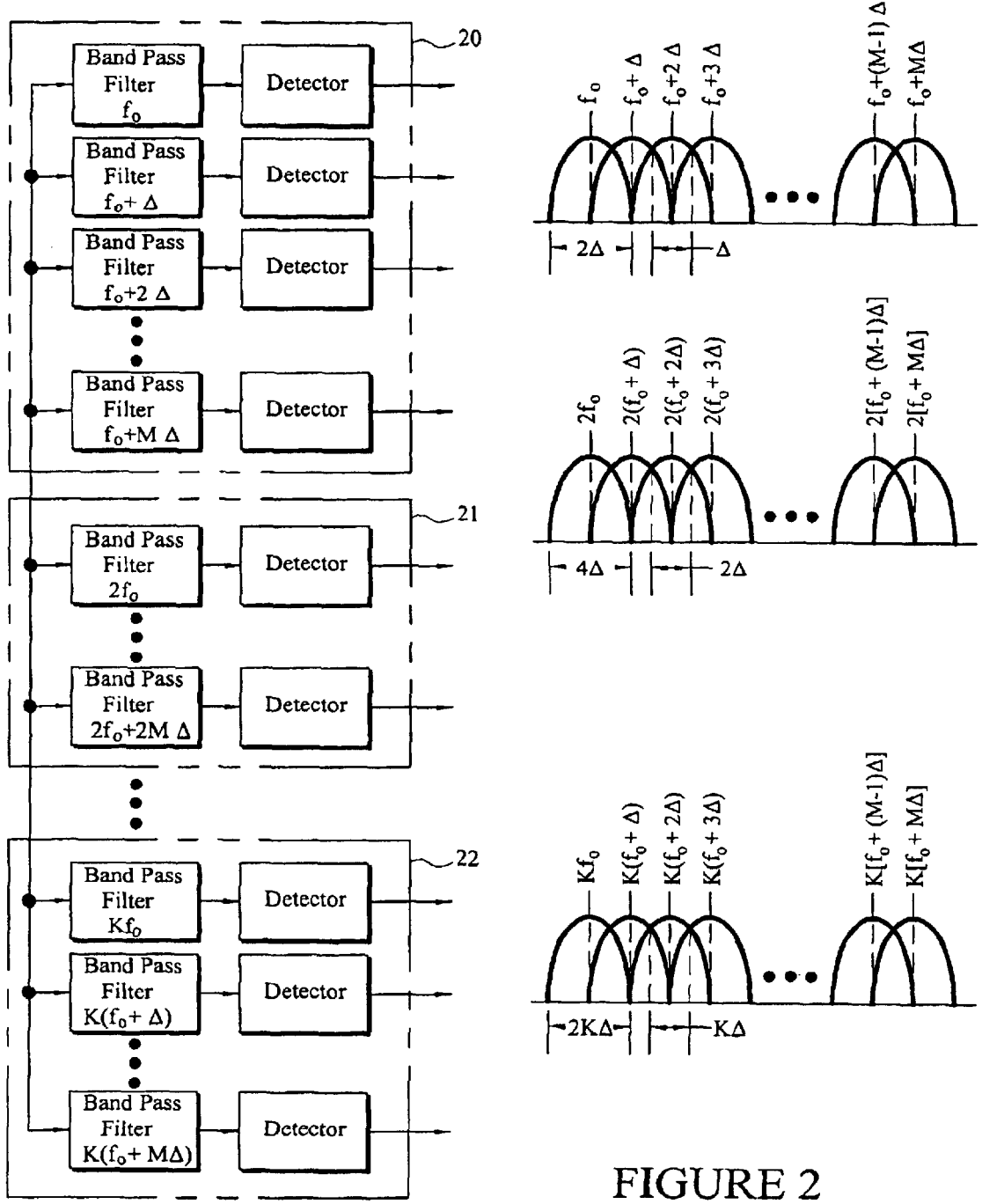
FIG. 2 is a block diagram of a harmonic signal processor also known in the prior art.

In many applications the frequency of the received signal is not stable, varying as a function of time. In order to process these signals wide bandwidths about the fundamental frequency and the harmonic frequencies are required. These wide bandwidths, however, increase the noise coupled to the detectors causing a reduction in the signal to noise ratio. Improvement in the signal to noise may be achieved by providing a multiplicity of filters of relatively narrow bandwidths to cover the desired frequency range as illustrated in FIG. 2. Filter bank 20 includes a multiplicity of filters having overlapping frequency responses with null bandwidths $2\Delta$, and center frequencies at $f_o$ and $f_o$ plus an integral multiple of half null bandwidths $\Delta$, $f_o$ in general being a frequency that is lower than the expected fundamental frequency. The half null bandwith $\Delta$ is chosen to be of sufficient width to maintain the signal frequency within the filter crossover points for the duration of an integration interval. Subsequent filter banks are responsive to harmonics of the fundamental frequencies to which the filters of filter bank 20 respond. As for example, filter bank 21 is responsive to the second harmonics and contains filters with center frequencies at $2f_o$ through $2f_o+2M\Delta$. The filters in the filter bank 21 have overlapping frequency responses with bandwidths $2\Delta$ and center frequencies at $2f_o$, and $2f_o+2$ times an integral number of bandwidths as soon in FIG. 2. The ultimate filter bank 22 in the sequence is responsive to the $k^{TH}$ harmonic, having overlapping frequency responses with bandwidths $k\Delta$ and center frequencies at $kf_o$ and $kf_o+k$ times an integral number of bandwidths $\Delta$. Each filter in a filter bank is followed by a detector, which may be of the envelope or square law type, to provide a signal that may be utilized for a spectral display and post detection processing.

Figure 3:
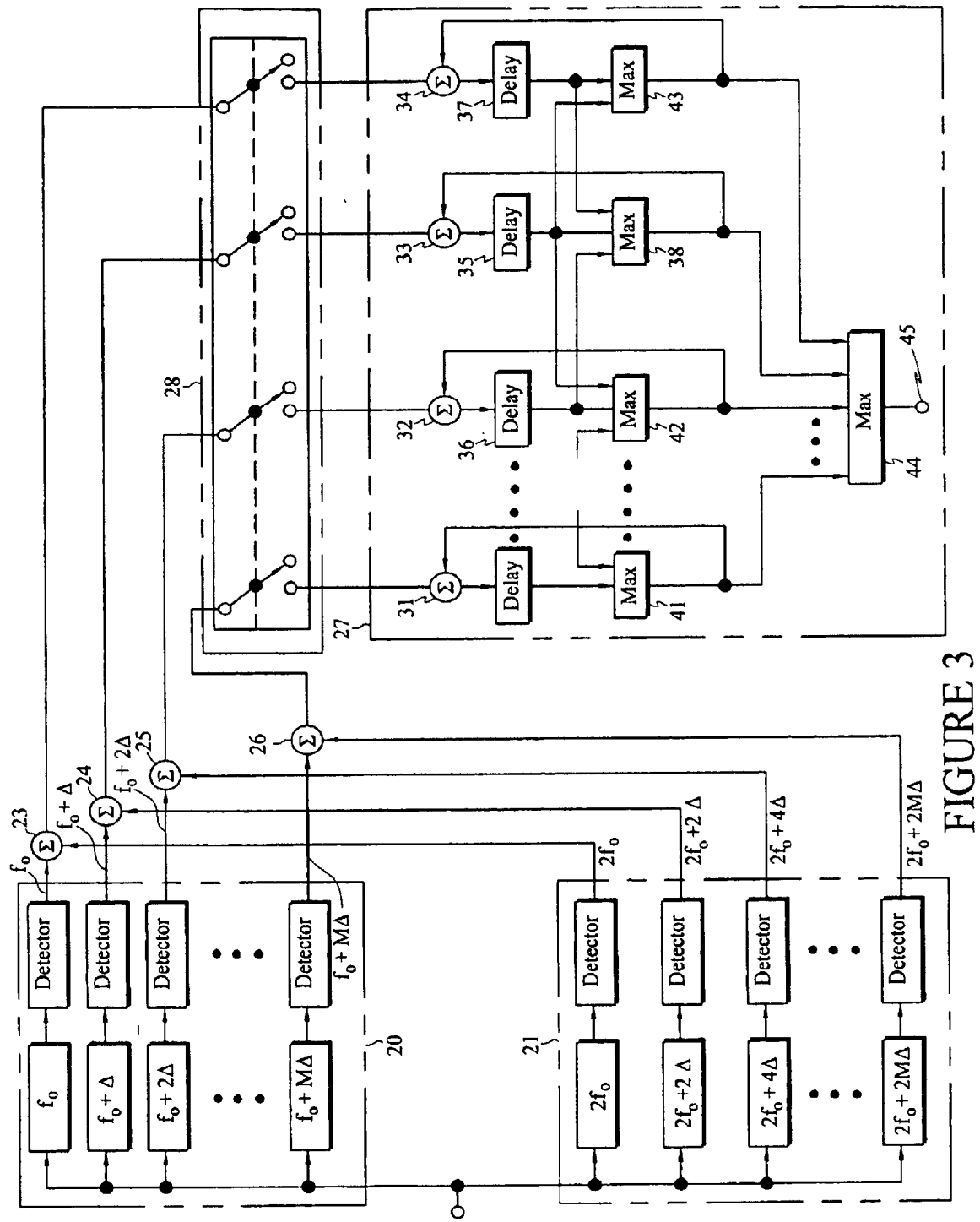
FIG. 3 is a block diagram of the invention for processing a signal having fundamental and second harmonic signal components.

Consider a received waveform for processing that may be described by:

$$r(t)=\cos[\phi(t)]+\cos[2\phi(t)+0]n(t)$$

where n (t) is corrupting noise. This signal has components at radian frequencies $\phi(t)$ and $2\phi(t)$. Consequently, if the signal appears in the $m^{TH}$ filter of filter bank 20 the second harmonic component will appear in the $m^{TH}$ filter of the second harmonic filter bank 21. Enhanced signal detection ability will therefore be realized when the waveforms of the two detected signals are added. If such an addition is performed for the M+1 filter pairs of filter banks 20 and 21 a processor as illustrated in FIG. 3 results. Detected output signals from filter $f_o$ of filter bank 20 and filter $2f_o$ of filter bank 21 are summed in adder 23 while the remaining corresponding pairs are summed in like manner in adders 24, 25–26. The output signals from the adders 23–26 are analogous to the spectral output of filter bank 20, with the added advantage that the output signal from the filter detector combination of filter bank 20 responding to the input signal has been increased by the addition of the output signal from the corresponding filter detector combination of filter bank 21. This spectrum like output signal can now be processed and displayed using conventional spectral processing techniques.

The output signals from adders 23, 24, 25–26 may be coupled to a dynamic signal frequency processor 27 via a sampling circuit 28. It should be recognized that the sampling circuit 28 would not be required if the output signals from adders 23–26 were analog signals.

At each sampling time signals are coupled from the adders 23–26 to adders 31–34 of dynamic signal frequency processor 27 via a sampling circuit 28. As for example, signals coupled from adders 23, 24, and 25 respectively to adders 32, 33, and 34. The signal coupled to adder 33 is added therein to the signal at the output terminal of the maximum signal determination circuit 38, which is the maximum signal at the output terminals of adders 32, 33, and 34 at the previous sampling time. This addition increases the signal level at the output terminal of adder 33. The improved signal is delayed by one sampling period in a delay line 35 and coupled to maximum determination circuits 38 wherein it is compared to the signals at the output terminals of adders 32 and 34, coupled to maximum determination circuit 38 via delay lines 36 and 37 having delays substantially equal to the delay line 35. A similar integration is performed for the signals at each of the output terminals of adders 23–26. The signals at the output terminals of the maximum signal determination circuits 38, 41, 42, and 43 are additionally coupled to a maximum signal determination circuit 44 wherein the maximum of the integrated signals at the output of the maximum signal determination circuits 38, 41, 42 and 43 is determined and provided at an output terminal 45. This processing permits the automatic detection of signals having a multiplicity of harmonic components.

Figure 4:
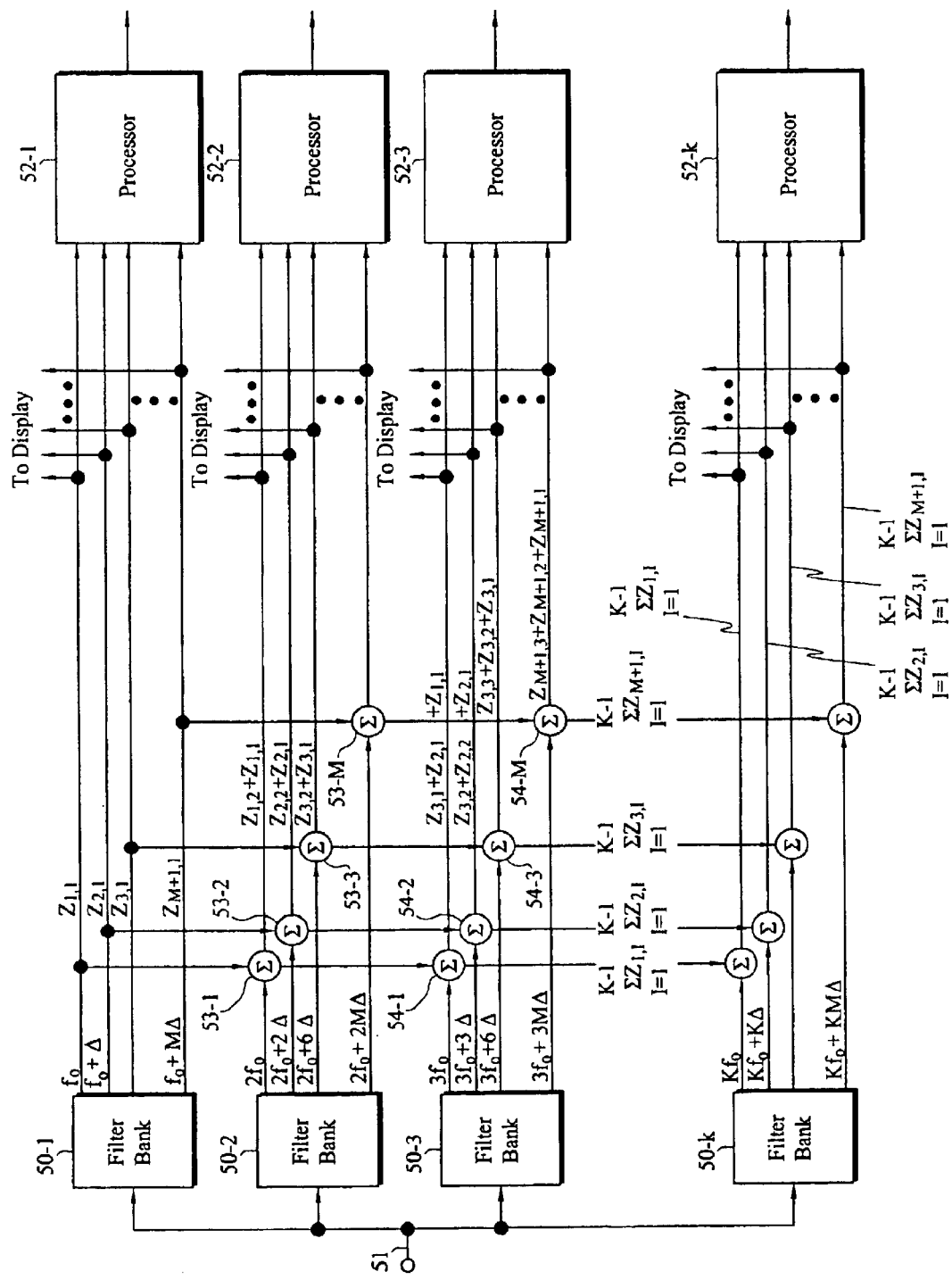
FIG. 4 is a block diagram of an embodiment of the invention for processing signals with a multiplicity of harmonic components.

Refer now to FIG. 4 wherein a block diagram of a system for detecting signals with k possible harmonic components is shown. Such a signal maybe coupled to the input terminals of filter banks 50-1 through 50-k via terminal 51 and separated in accordance with the harmonic content of the received signal to provide signals at the output terminals of each filter bank 50-1 through 50-k. The fundamental frequencies $f_o$ through $f_o+M\Delta$ are coupled through filter bank 50-1 and signals at the second through $k^{TH}$ harmonics of the frequencies are respectively coupled through subsequent filter banks 50-2 through 50-k. The output signals $Z_{1,1}$ through $Z_{m+1,1}$ of filter bank 50-1 are coupled to a processor 52-1 of the dynamic signal frequency type previously described, may also be coupled to a display unit (not shown), and respectively to summation networks 53-1 through 53-M wherein the output signals from the filters in the filter bank 50-1 are correspondingly added to the output signals of the filters in filter bank 50-2 to provide a sum of fundamental and second harmonic signals. These sums $Z_{1,2}+Z_{1,1}$ through $Z_{M+1,2}+Z_{M+1,1}$ are coupled to processor 52-2, which may be of the same type as processor 52-1, may also be coupled to display unit (not shown), and to summation networks 54-1 through 54-M wherein the summed output signals from summation networks 53-1 through 53-M are added to the output signals from the filters of filter bank 50-3 to provide sums of the harmonically related signals at the output terminals of the corresponding filters in filter banks 50-1 through 50-3. This process continues until the output signals from the filters and filter bank 50-k are added to the sum to provide summations $$\sum_{l=1}^{k} Z_1, I$$

through $$\sum_{l=1}^{k} Z_{M+1}, I.$$

These final summations are coupled to processor 52-k which may be of the same type as the processor 52-1, and may be coupled to a display unit (not shown). Output signals from processors 52-1 through 52-k are detections of the fundamental and harmonically enhanced signals that may be utilized to determine the spectral content of the received signal and for overall system purposes.

Figure 5:
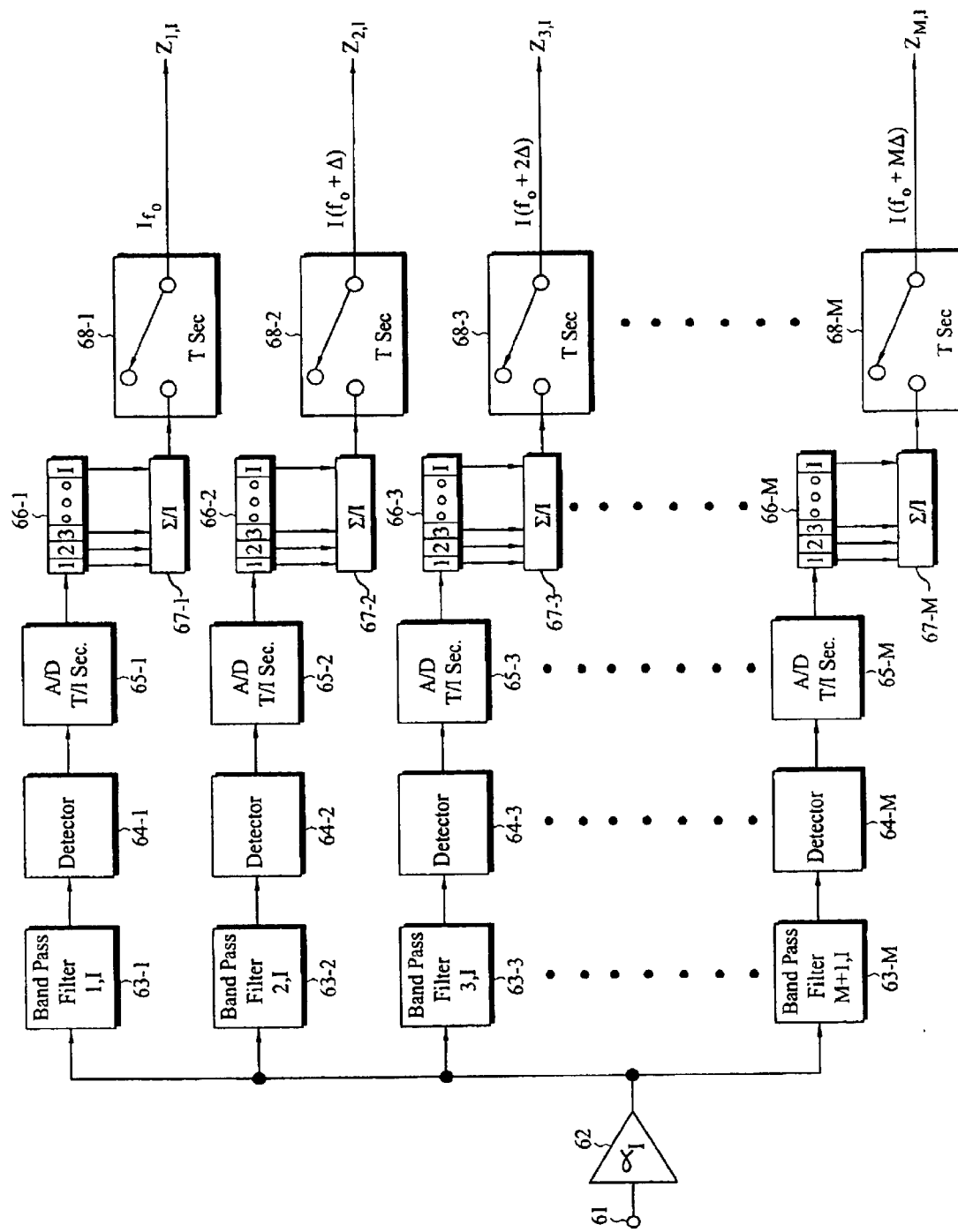
FIG. 5 is a block diagram of a filter that may be employed in the embodiments of FIGS. 3 and 4.

The $I^{TH}$ filter bank in the plurality of filter banks 50 maybe configured as shown in the block diagram of FIG. 5. An analog signal at the input terminal 61 of the filter bank is weighted by a factor $\alpha_I$, the value of which will be discussed subsequently, in amplifier 62 and the output signal thereof simultaneously coupled to bandpass filters 63-1 through 63-M each with bandwidth $I\Delta$ and center frequencies $I(f_o+m)\Delta$, where m=0, 1, 2, . . . , M. The output signals from these bandpass filters are correspondingly coupled to detectors 64-1 through 64-M, which may be of the square-law type, and detected signals therefrom may be correspondingly coupled to analog-to-digital (A/D) converters 65-1 through 65-M wherein the detected signals are sampled at a rate T/I, T being the sampling rate for the fundamental filter bank. Signal samples of totality I are serially entered into shift registers 66-1 through 66-M from the A/D converters 65 and the sums of these samples are averaged over the number of shift register entries I in summation networks 67-1 through 67-M. These sums are respectively sampled at intervals of T seconds by sampling circuits 68-1 through 68-M and coupled for further processing as previously described.

The weighting factor $\alpha_I$ applied to the signals in each filter is chosen to maintain the relative signal-to-noise ratios of the received harmonic components. When the detectors 64 are of the square-law type the weighting factors $\alpha_I = P_{I/K}$, where $P_I$ is equal to the ratio of the expected signal power in the $I^{TH}$ harmonic divided by the expected power in the fundamental signal.

Figure 6A:
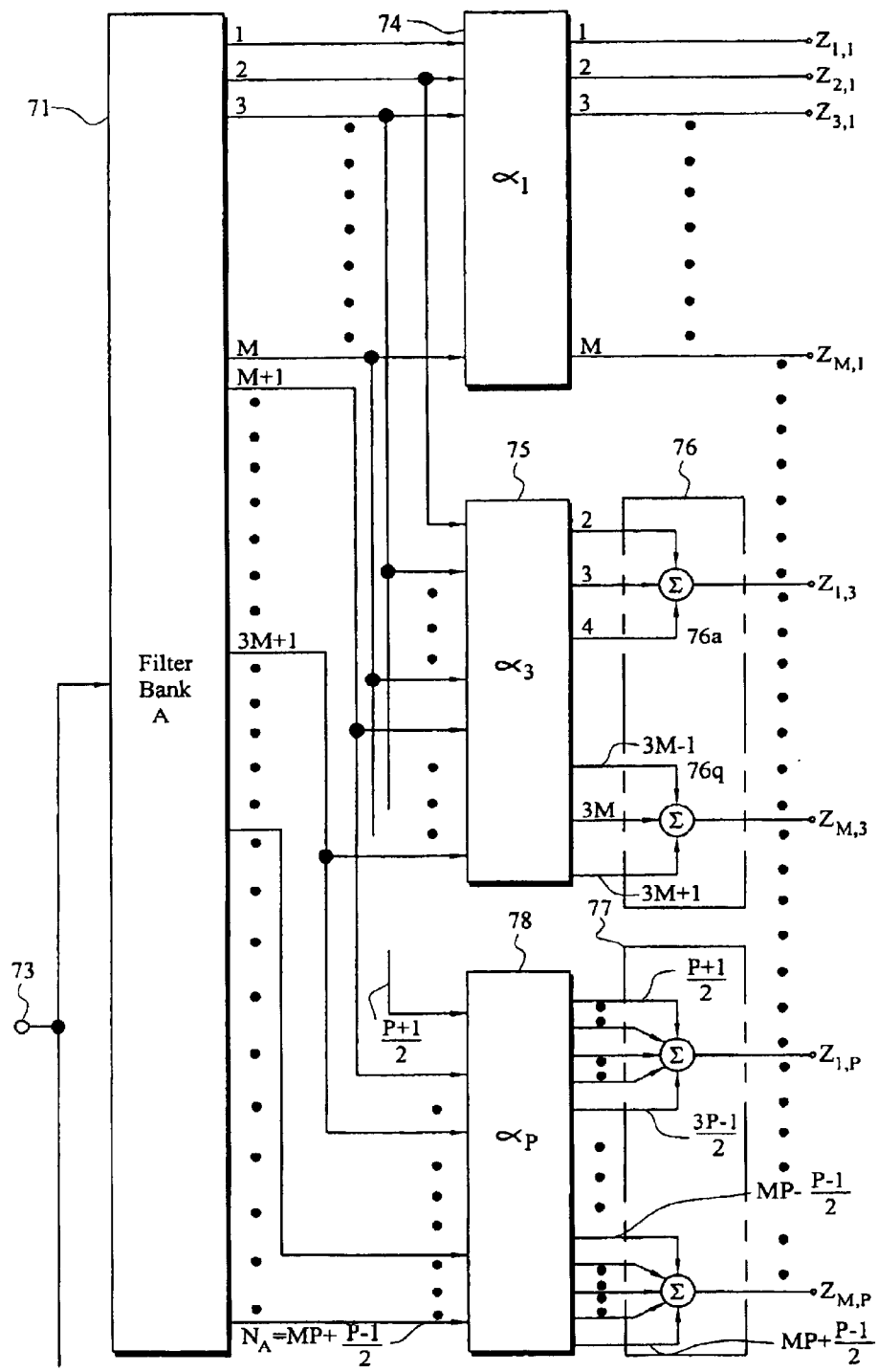
FIGS. 6A and 6B are portions of a block diagram of an embodiment of the invention for processing signals having components within a specified baseband.
Figure 6B:
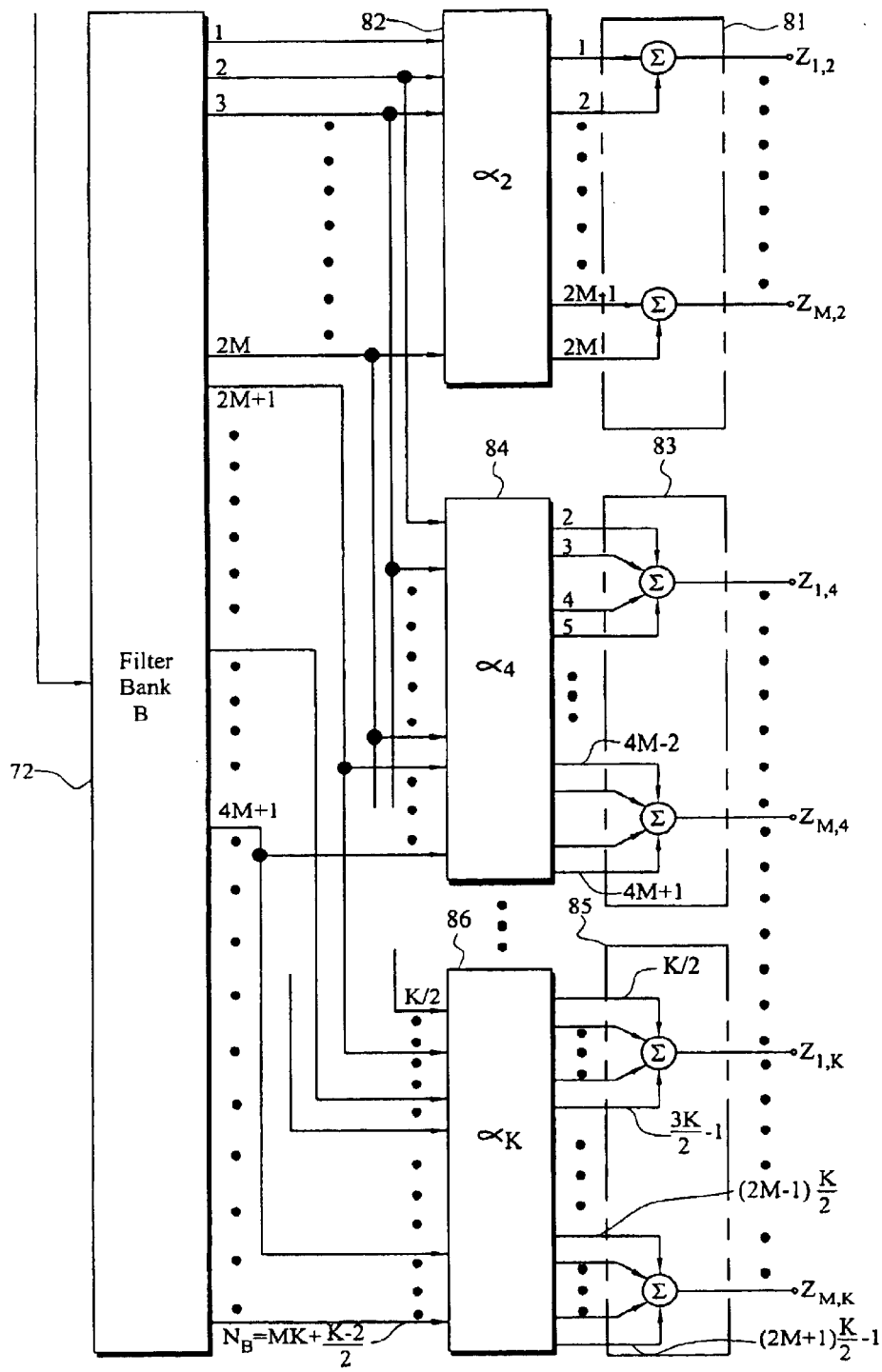
Figure 7:
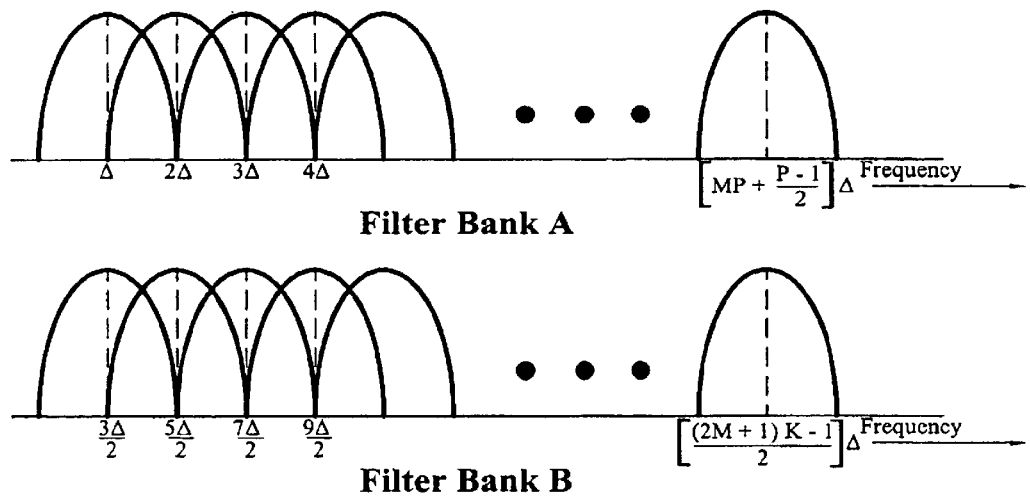
FIG. 7 is a representation of filter responses that may be employed for the embodiment of FIG. 6.

In many applications harmonically related signals are to be detected that possess a fundamental frequency band that extends between d.c. to $M\Delta$. Though the circuit of FIG. 4 may be employed by setting $f_o$ equal to zero and designing the filters accordingly, a significant savings in a number of filter banks employed may be realized with the embodiment shown in FIGS. 6A and 6B. Signals for detection are simultaneously coupled to filter banks 71 and 72 via an input terminal 73. Filter banks 71, 72 are each comprised of a plurality of filters each of bandwidth $2\Delta$, the filters of filter bank 71 having center frequencies at $m\Delta$, m=0, 1, 2, . . . , $$\left(MP + \frac{P-1}{2}\right),$$

while the filters of filter bank 72 have center frequencies at $[(2n+1)/2]\Delta$, n=1, 2, 3, . . . (2M+1)K/2−1 as shown in FIG. 7, where P is the highest odd harmonic and K is the highest even, harmonic of interest.

The output terminals of the first M filters of filter bank 71 are coupled to output terminals $Z_{1,1}$, $Z_{2,1}$ . . . $Z_{M,1}$ via amplifiers 74. The output terminals of filters 2 through M are further coupled to amplifiers 75 to which the output terminals of filters M+1 through 3M+1 are also coupled. The output terminals of amplifiers 75 are summed in three's in summation networks 76, as for example, the output terminals 2, 3, and 4 of filter bank 71. Each summation circuit 76a through 76q in summation networks 76 is coupled via amplifiers 75 to the output terminals of 3 contiguous filters in filter bank 71, as for example, summation circuit 76a is coupled to the output terminals of filters 2, 3, and 4 summation circuit 76b (not shown) is coupled to the output terminals of filters 5, 6, and 7 of filter bank 71 and so on until summation circuit 76q is coupled to the output terminals of filters 3M−1, 3M and 3M+1. Thus the 3M output ports of filter bank 71 that are coupled to the amplifiers 75 are reduced to M output ports by the summation network 76, providing output ports $Z_{13}$ through $Z_{M3}$. This grouping continues until output terminals of filter bank 71 are coupled and combined in summation network 77. The filters that are ultimately grouped include filter $$\frac{P+1}{2}$$

through MP+

$$\frac{P-1}{2}.$$

Figure 8:
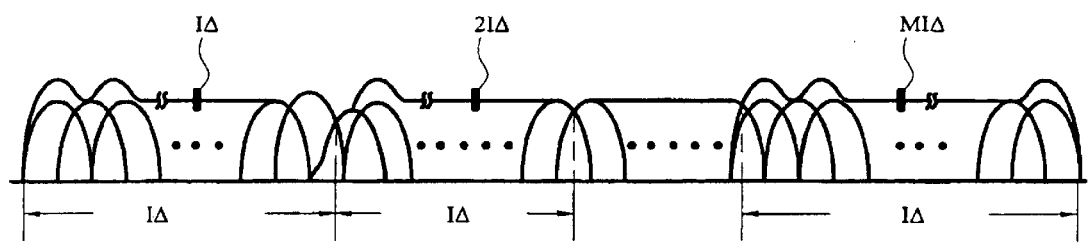
FIG. 8 is a representation of the frequency response at the output terminal in the embodiment of FIG. 6.

In this manner I=1, 3, 5, . . . P filters are grouped to establish filters in each group with center frequencies $I\Delta$, $2I\Delta$, $3I\Delta$ . . . , $IM\Delta$, each of which has a group bandwidth $I\Delta$, as shown in FIG. 8.

While the filters in filter bank 71 are grouped with odd multiplicity filters in filter bank 72, which have equal bandwidths to those in filter bank 71 but have center frequencies upward shifted by half a bandwidth, are grouped in even multiples. Thus the first 2M filters of filter banks 72 are summed in pairs in summation network 81 after amplification in amplifiers 82, thereby providing M output terminals $Z_{1,2}$ through $Z_{M,2}$. In the second groupings filters 2 through 4M+1 are summed by fours in summation network 83 after amplification in amplifiers 84, thereby providing M output terminals $Z_{1,4}$ through $Z_{M,4}$. This increasing number of filter groupings continues until the final grouping of K filters, involving filters K/2 through (2M+1)K/2−1, is achieved via summation network 85 and amplifiers 86 to provide the final set of M filter output terminals $Z_{1,K}$ through $Z_{M,K}$.

Figure 9:
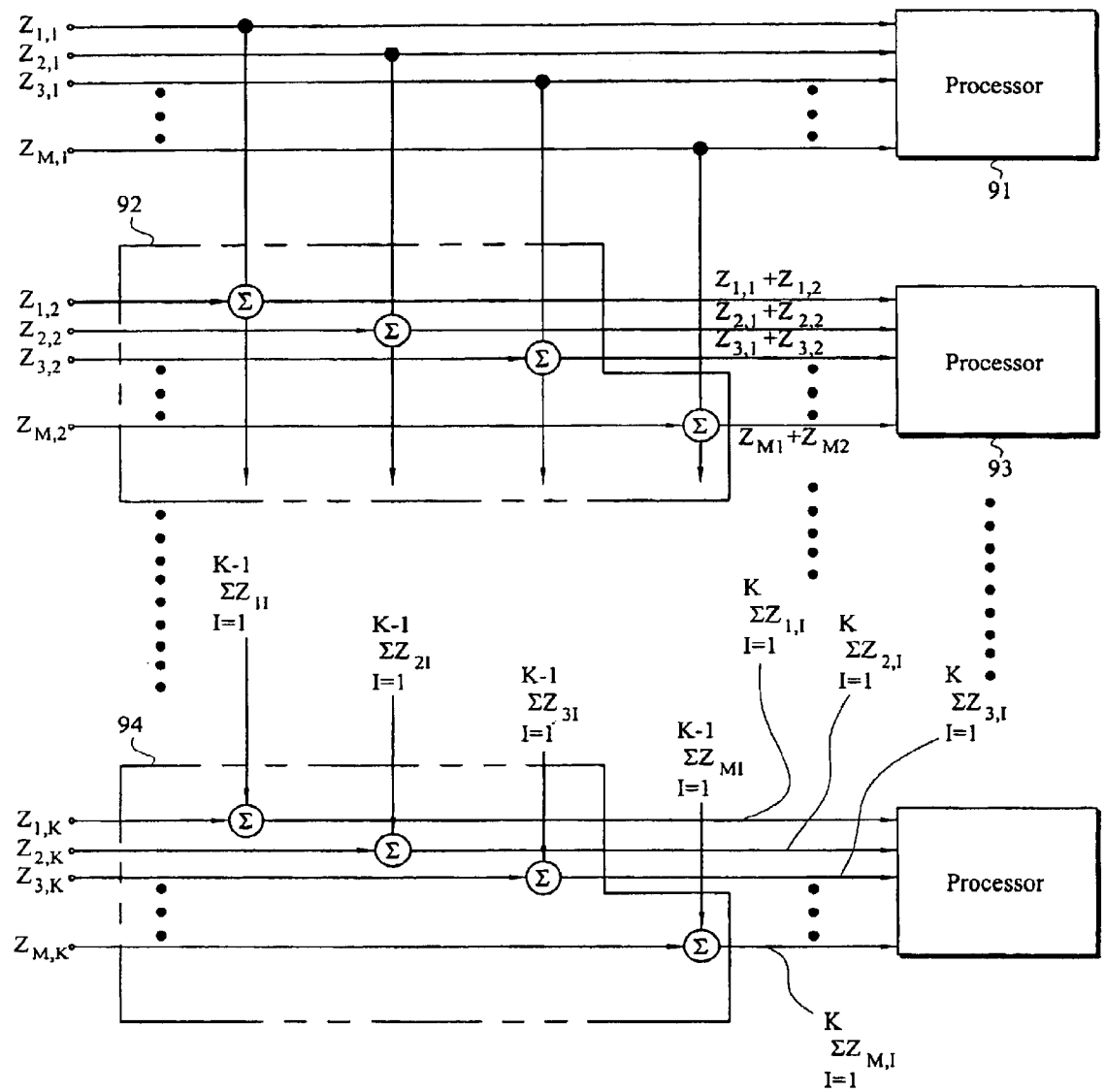
FIG. 9 illustrates a manner of combining the output terminals of the summation networks of FIG. 6.

As previously discussed the amplification factors are chosen to provide weighting factors to the output signals of the filters that maintain the expected relationships of the signal-to-noise ratios of the fundamental harmonic signals. Additionally, the output terminals $Z_{M,N}$ are coupled to summation networks and processors in the manner described for the output terminals of the filter banks 50-1 through 50-k in FIG. 4. FIG. 9 further illustrates this coupling. $Z_{1,1}$ through $Z_{M,1}$ are coupled to a processor 91 and to summation network 92 wherein the terminals are correspondingly coupled to terminals $Z_{1,2}$ through $Z_{M,2}$ in an additive manner. The output terminals of these additions are coupled to a second processor 93 and correspondingly to the group of output terminals next succeeding in the numerical order until in summation network 94 all $Z_{J,I}$ are summed over all I from 1 to K.

While the invention has been described in its preferred embodiments, it is to be understood that the words which have been used are words of description rather than of limitations and that changes within the purview of the appended claims may be made without departing from the true scope and spirit of the invention in its broader aspects.

I claim:

1. An apparatus for detecting signals having harmonically related components comprising:

filter means coupled to receive said signals for separating said signals into harmonically related frequency bands, each frequency further divided into sub-bands, with corresponding sub-bands being said harmonically related;

combining means coupled to said filter means for adding corresponding sub-band output signals from said filter means with selected harmonic relationships to provide a plurality of sum signals; and means coupled to said combining means for processing said sum signals to establish detections of said signals having harmonically related components.

2. An apparatus in accordance in claim 1 wherein said filter means comprises K filter banks responsive respectively to a fundamental frequency band through a $K^{TH}$ harmonic of said fundamental frequency band, each filter bank including a multiplicity of M+1 filters responsive respectively to signals within frequency bands $I[f_o+(L-1)\Delta]$ and $I[f_o+(L+1)\Delta]$, $2I\Delta$ being a null-to-null bandwidth for each filter where I=1, 2, 3 . . . , K and L=0, 1, 2, 3, . . . M for each I.

3. An apparatus in accordance with claim 2 wherein combining means includes a plurality of summation networks coupled to combine said M+1 filters in each of said K filter banks to provide signals representative of filter output. signal sums given by $$\sum_{J=1}^{I} Z_{(L+1)},$$

J where $Z(L+1)$, J is an output signal from a filter (L+1) in filter bank J.

4. An apparatus in accordance with claim 2 wherein said combining means includes: first combiner means coupled between said filter means and said processing means for combining odd harmonics of said fundamental frequency band; and second means coupled between said filter means and said processing means for combining even harmonics of said fundamental frequency band.

5. An apparatus in accordance with claim 4 wherein said filter means includes, a first filter bank having [MP+(P−1)/2] filters, M being a predetermined number and P being a predetermined odd, number, each filter respectively having a center frequency at nΔ, n=1, 2 ,3 . . . , [MP+(P−1)/2] and a null-to-null bandwidth equal to 2Δ;

a second filter bank having MK+K−2/2 filters, K being a predetermined even number one integer removed from P, each filter respectively having a center frequency at gΔ, g=3/2, 5/2, 7/2 . . . , [(2M+1)K−1]/2 and a null-to-null bandwith equal to 2Δ;

said first combiner means includes a first summation network coupled to a preselected number of first filter bank output terminals 1 through M for providing M signals representative of signals at each of said first filter bank output terminals, a third summation network coupled to said first filter bank output terminals 2 through 3M+1 for combining said output terminals 2 through 3M+1 in groups of threes for providing M signals representative of summations of each group of three combined output terminals, said grouping continuing in such manner to provide M groups with increasing odd number of said first filter bank output terminals summed therein through summation network P coupled to output terminals (P+1)/2 through MP+(P−1)/2 of said first filter bank for summing said output terminals of, filters (P+1)/2 through MP+(P−1)/2 in groups of P for providing M signals representative of summations of signals from each grouping of P output terminals; and said second combiner means includes a second summation network coupled to a preselected number of said second filter bank output terminals 1 through 2M to provide M signals each representative of a summation of signals from a group of two output terminals, a fourth summation network coupled to output terminals 2 through 4M+1 of said second filter bank for summing said output terminals 2 through 4M+1 in groups of four for producing M signals each representative of a summation of signals at four grouped output terminals, said grouping continuing in such manner to provide M groups with increasing even number of said second filter bank output terminals summed therein through summation network K coupled to output terminals K/2 through MK (K−2)/2 of said second filter bank for summing said output terminals K/2 through MK+(K−2)/2 in groups of K for providing M signals each representative of summations of signals at K grouped output terminals.

6. An apparatus in accordance with claim 5 wherein said first combiner means further includes means coupled between said first filter bank output terminals and said odd grouping summation networks for providing weights to signals at said first filter bank output terminals and means coupled between said second filter bank output terminals and said even grouping summation networks for providing weights to signals at said second filter bank output terminals.

* * * * *